United States Patent [19]
Aarts et al.

[11] Patent Number: 4,738,064
[45] Date of Patent: Apr. 19, 1988

[54] HERMETICALLY SEALED WINDOW

[75] Inventors: Franciscus H. E. Aarts; Jacob Vijfvinkel, both of Eindhoven, Netherlands

[73] Assignee: U.S. Philips Corporation, New York, N.Y.

[21] Appl. No.: 324,736

[22] Filed: Nov. 25, 1981

Related U.S. Application Data

[63] Continuation of Ser. No. 130,283, Mar. 14, 1980, abandoned.

[30] Foreign Application Priority Data

Mar. 21, 1979 [NL] Netherlands ..................... 7902202

[51] Int. Cl.⁴ .............................................. G01F 23/02
[52] U.S. Cl. .................................... 52/204; 52/397; 73/334; 220/82 A; 350/319
[58] Field of Search ............ 220/89 A, 82 R; 73/323, 73/330, 331, 334, 431, 327, 328; 350/319, 252; 52/204, 397, 304

[56] References Cited

U.S. PATENT DOCUMENTS

| | | | |
|---|---|---|---|
| 2,917,924 | 12/1959 | Messik | 220/82 R |
| 3,194,364 | 7/1965 | Kolm | 52/397 |
| 3,829,201 | 8/1974 | Whiting . | |
| 3,977,251 | 8/1976 | Meginnis | 220/82 A |

FOREIGN PATENT DOCUMENTS

| | | |
|---|---|---|
| 2027276 | 8/1970 | France . |
| 2067407 | 8/1971 | France . |
| 538703 | 8/1973 | Switzerland . |
| 221536 | 9/1924 | United Kingdom . |

OTHER PUBLICATIONS

Stromberg, H.D., et al., "A Window Configuration for High Pressure Optical Cells", *The Review of Scientific Instruments*, vol. 41, No. 12, pp. 1880–1881 (Dec. 1970).

*Primary Examiner*—John E. Murtagh
*Attorney, Agent, or Firm*—Marc D. Schechter

[57] ABSTRACT

A window of a transparent material suitable for closing an opening in a wall of a sealed container, which window has two conical portions whose bases face each other. An elastic seal is interposed between each of the conical surfaces and the wall of the opening.

4 Claims, 1 Drawing Sheet

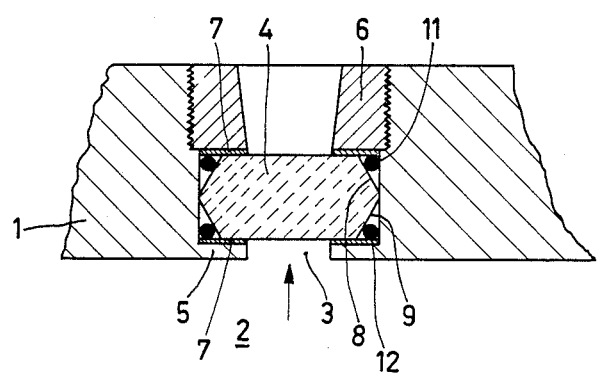

HERMETICALLY SEALED WINDOW

This is a continuation of application Ser. No. 130,283, filed Mar. 14, 1980 and now abandoned.

BACKGROUND OF THE INVENTION

The invention relates to a window of a transparent material suitable for closing an opening in a wall of a sealed container. The window comprises at least one conical surface which via sealing means cooperates with the wall of the opening to be closed.

Windows of the type to which the present invention relates are employed in the walls of high-pressure vessels and vacuum vessels, thus enabling optical measurements to be performed on material samples located in these vessels.

The known windows are, for example, made of sapphire. Sapphire, however, is not suitable for all optical measurements.

The windows generally take the form of a cylinder with accurately parallel end faces.

Sealing between the end faces and the wall of the opening is generally obtained by firmly clamping the window in place and appyling a soft metal to the sealing faces which deforms and diffuses into the sealing faces. Very stringent requirements are then imposed on the surface condition and the accuracy of shape of the sealing faces.

Another known type of window is described in "The Review of Scientific Instruments", Volume 41, No. 12, December 1970, pages 1880–1881. This known window takes the form of a cone which cooperates with an equally conical wall of the opening. Pyrophyllite is used, as sealing material, between the sealing faces. A drawback of this window is that stringent requirements have to be imposed on the surface condition and the accuracy of shape of the sealing faces.

A further disadvantage of the known window constructions is that the permissible pressure differentials are comparatively low, which leads to a requirement for fairly great window dimensions (thickness) in the direction of the pressure differential. A thick window gives rise to a high absorption of the measuring signal.

A further disadvantage of the known windows is that after disassembly the seals are no longer reusable; either new windows have to be mounted or the disassembled windows have to be reconditioned.

SUMMARY OF THE INVENTION

It is an object of the invention to provide a window which, having the same thickness as known windows, can withstand a higher pressure than the known windows. It is a further object of the invention to provide a window which can be mounted and removed several times without intermediate reconditioning.

The window according to the invention comprises two conical portions with facing bases. An elastic seal is provided between each of the conical surfaces and the wall of the opening.

No stringent requirements are imposed on windows according to the invention in respect of the surface condition and accuracy of shape of their sealing faces. This is because the elastic seals are always correctly seated. Owing to the pressure difference existing across the window, the seals are urged against the sealing walls. Owing to the conical shape, the window can withstand large pressures, which enables the use of windows of considerably smaller thickness than before. This also enables materials other than sapphire to be used, such as for example quartz. According to the invention, the sealing means may be O-rings.

BRIEF DESCRIPTION OF THE DRAWING

The drawing is a cross-section view of a window according to the invention mounted in a wall of a pressure vessel.

DESCRIPTION OF THE PREFERRED EMBODIMENTS

In the drawing, by way of example, a part bordering a wall 1 of a high-pressure space 2 is shown. Wall 1 has an opening 3 therein. In the opening 3 a quartz window 4 is mounted. The window 4 is included between an annular portion 5 of the wall 1 and an annular retaining screw 6. Furthermore, annular plates 7 of a soft metal, for example copper, are inserted between the window 4 and, respectively, the wall portion 5 and the screw 6.

The window has two substantially conical portions 8 and 9 with common bases.

Each of the portions 8 and 9 is sealed with respect to the side surface of the wall of the opening 3 by means of O-ring 11 and 12, respectively. In a practical case the diameter of the base of the two conical portions 8 and 9 was 15 mm and the thickness of the window was 7 mm. The conical portions 8 and 9 each have, for example, an apex angle of 60°. This window can readily withstand a pressure of 1000 bars at a temperature of 1100° C. and did not break down after having been disassembled several times.

At room temperature the window described has been repeatedly tested with success up to 2250 bars. The cause of this is probably that during the build-up of pressure in the space 2 the O-rings 12 and 11 are pressed upon by the oblique faces 8 and 9. The pressure also causes a compressive stress on the window, which reinforces the window.

Although in the drawing the end faces of the window are parallel, the window may also take the form of a lens with for example convex end faces.

What is claimed is:

1. A disassemblable window assembly for sealing an opening in a wall of a vessel, said opening being bounded by a side surface of the wall, said window assembly comprising:
   a window, having two conical surfaces with a common base, the entire periphery of said base directly contacting the side surface bounding said opening; and
   at least two elastic seals, one elastic seal being interposed between and contacting each conical surface and the side surface bounding said opening.

2. A disassemblable window assembly as claimed in claim 1, characterized in that the elastic seals are O-rings.

3. A disassemblable window assembly as claimed in claim 2, characterized in that the side surface is cylindrical in shape.

4. A disassemblable window assembly as claimed in claim 3, characterized in that:
   the opening is also bounded by two annular surfaces which are substantially perpendicular to the side surface, said annular surfaces being located at opposite ends of the cylindrical surface;
   the window is compressed between the annular surfaces; and
   each O-ring also contacts one annular surface.

* * * * *